No. 775,822. Patented November 22, 1904.

UNITED STATES PATENT OFFICE.

KARL HUFNAGEL, OF SILBERHÜTTE-ANHALT, GERMANY, ASSIGNOR TO EDWARD H. WAGNER, OF NEW YORK, N. Y.

PYROTECHNICAL COMPOUND.

SPECIFICATION forming part of Letters Patent No. 775,822, dated November 22, 1904.

Application filed September 15, 1904. Serial No. 224,620. (No specimens.)

*To all whom it may concern:*

Be it known that I, KARL HUFNAGEL, a subject of the Emperor of Germany, residing at Silberhütte-Anhalt, Ballenstedt, and Duchy of Anhalt, Germany, have invented certain new and useful Improvements in Pyrotechnical Compounds; and I do declare the following to be a full, clear, and exact description of the invention, such as will enable others skilled in the art to which it appertains to make and use the same.

This invention relates to compounds for the manufacture of pyrotechnical torpedoes or matches; and the principal object of the same is to provide a compound which will cause a series of rapidly-repeating reports and which will not require matches or fire to ignite the pieces.

The compound referred to consists of the following chemical constituents in substantially the proportions indicated: white phosphorus, one part; amorphous or red phosphorus, one part; potassium chlorate, three parts; red argillacious clay or pigment, two parts; gum-arabic, five parts. This compound when properly mixed into a mass and inclosed in capsules, in sticks, or suitable covers may be ignited by friction or concussion, which results in a series of rapidly-repeating intermittent or staccato reports.

Having thus described my invention, what I desire to secure by Letters Patent and claim is—

A pyrotechnical compound consisting of white phosphorus, amorphous or red phosphorus, potassium chlorate, red clay and gum-arabic, in substantially the proportions set forth.

In testimony whereof I have hereunto set my hand in presence of two subscribing witnesses.

KARL HUFNAGEL.

Witnesses:
   FRANZ BONHOUR,
   CARL GADAU.